No. 611,442. Patented Sept. 27, 1898.
C. W. VAUGHAN.
SWIVEL PIPE COUPLING.
(Application filed Mar. 23, 1898.)
(No Model.)
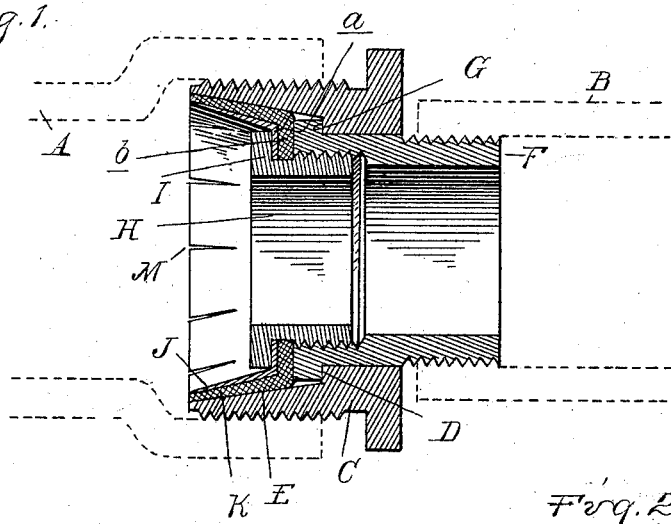
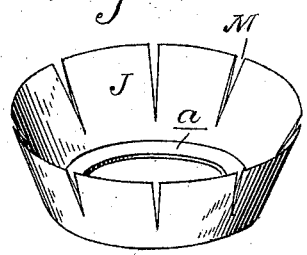
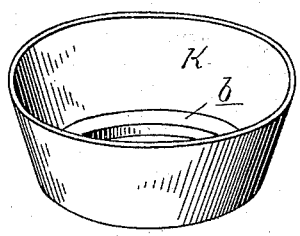
Witnesses
Inventor
Charles W. Vaughan
By [signature] Attys.

UNITED STATES PATENT OFFICE.

CHARLES W. VAUGHAN, OF HILLSDALE, MICHIGAN, ASSIGNOR OF ONE-FOURTH TO JOHN R. SUTTON, OF SAME PLACE.

SWIVEL PIPE-COUPLING.

SPECIFICATION forming part of Letters Patent No. 611,442, dated September 27, 1898.

Application filed March 23, 1898. Serial No. 674,892. (No model.)

*To all whom it may concern:*

Be it known that I, CHARLES W. VAUGHAN, a citizen of the United States, residing at Hillsdale, in the county of Hillsdale and State of Michigan, have invented certain new and useful Improvements in Swivel Pipe-Couplings, of which the following is a specification, reference being had therein to the accompanying drawings.

The invention consists in the construction of a swivel pipe-coupling, and particularly in such a coupling comprising two tubular members of different diameter, the larger member having an internal terminal flange or shoulder and an inclined face, the smaller member having a corresponding flange or shoulder and a flaring spring-cup acting to make a tight joint or packing against the inclined face of the larger member.

The invention further consists in the construction, arrangement, and combination of the various parts, all as more fully hereinafter described.

In the drawings I have shown in Figure 1 a central longitudinal section through a joint embodying my improvements; Fig. 2, a perspective view of the spring-cup, and Fig. 3 a perspective view of the packing-ring.

A and B are two pipes which are adapted to be coupled by my swivel-joint. The pipe A is either of larger diameter than the pipe B or I may enlarge it at the end, as shown in the drawings. It is interiorly screw-threaded to receive the bushing C. This bushing has on its inner face the flange or shoulder D and tapered outward from this flange or shoulder the inclined face E.

F is a bushing in the smaller pipe, fitting within the bushing C so that it is free to turn therein and having a flange or shoulder G complementary to the shoulder D, permitting rotary movement, but preventing endwise disengagement of the two parts.

H is a ring or nipple secured in any suitable manner in the end of the bushing F, preferably by having exterior screw-threads engaging screw-threads in an annular gain or recess in the inner end of said bushing. The nipple H has a flange I at the end, which holds a spring-cup J and a corresponding cup-shaped packing K in position. This is done by forming flanges, such as $a\ b$, on the inner end of the spring-cup and the packing-cup, which are clamped by the flange I against the end of the bushing F. This spring-cup is preferably slotted, as shown at M, so as to have perfect spring action all around, the spring acting to press the packing K tight against the inclined face E on the bushing C.

This swivel-joint is especially intended for use in a pipe-coupling between cars or railway-trains for air-braking or steam-heating purposes, and in such use the internal pressure acting against the interior face of the spring-cup will force it out and act to force the packing tight against its bearing-face E, and in practice it has been found that such a packing will make an absolutely air-tight joint, even if there be considerable free endwise movement of the two parts when the pressure is not on. This makes the device perfectly easy to turn in adjusting it to the various positions required by the operator, such as making the couplings, hanging it up, &c.

What I claim as my invention is—

1. In a swivel pipe-joint, the combination with the female member having an internal terminal flange or shoulder, and an inclined face having its smallest diameter at the outer end, of the male member having a corresponding external flange or shoulder and a flaring spring-cup secured to its end against the inclined face.

2. The combination of two bushings of different diameter, one within the other and having shouldered meeting faces to allow turning but to prevent endwise disengagement, an incline on the inner face of the outer bushing, a spring-cup and a packing pressed by the spring-cup against the inclined face of the outer bushing and means for securing the spring-cup and packing in place.

3. The combination in a swivel pipe-coupling, of two pipes having their adjoining ends of different diameter, bushings in the ends of the pipes adapted to fit one within the other and having meeting shoulders to prevent endwise disengagement, an inclined face on the inside of the outer bushing tapering inwardly toward the outer end thereof, a flanged nipple in a recess in the end of the inner bushing, a flaring spring-cap having its inner edge turned inward, and a correspondingly-shaped packing-ring around the outside of the cup, the packing and cup being secured to the inner bushing by the flanged nipple.

4. In a swivel pipe-joint, two interengaging members having shoulders to prevent endwise separation, a flaring flexible packing extending beyond the inner end of the inner member and a corresponding flaring bearing on the outer member against which said packing is secured and adapted to bear.

In testimony whereof I affix my signature in presence of two witnesses.

CHARLES W. VAUGHAN.

Witnesses:
M. B. O'DOGHERTY,
OTTO A. BARTHEL.